US012644220B2

(12) United States Patent
Hong et al.

(10) Patent No.: US 12,644,220 B2
(45) Date of Patent: Jun. 2, 2026

(54) WASHING MACHINE AND METHOD OF CONTROLLING THE SAME

(71) Applicant: SAMSUNG ELECTRONICS CO., LTD., Suwon-si (KR)

(72) Inventors: Sunghwan Hong, Suwon-si (KR); Hochae Lee, Suwon-si (KR); Jungsoo Lim, Suwon-si (KR); Ansook Sul, Suwon-si (KR); Yunjoung Lee, Suwon-si (KR); Yeonkyoung Jung, Suwon-si (KR); Donok Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 3 days.

(21) Appl. No.: 18/647,635

(22) Filed: Apr. 26, 2024

(65) Prior Publication Data

US 2024/0352654 A1 Oct. 24, 2024

Related U.S. Application Data

(63) Continuation of application No. PCT/KR2024/004625, filed on Apr. 8, 2024.

(30) Foreign Application Priority Data

Apr. 19, 2023 (KR) ........................ 10-2023-0051625
Jan. 4, 2024 (KR) ........................ 10-2024-0001808

(51) Int. Cl.
*C11D 7/24* (2006.01)
*C11D 7/26* (2006.01)
(Continued)

(52) U.S. Cl.
CPC .............. *D06F 43/081* (2013.01); *C11D 7/24* (2013.01); *C11D 7/26* (2013.01); *C11D 7/30* (2013.01);
(Continued)

(58) Field of Classification Search
None
See application file for complete search history.

(56) References Cited

U.S. PATENT DOCUMENTS 5,467,492 A 11/1995 Chao et al.
5,977,045 A 11/1999 Murphy et al.
(Continued)

FOREIGN PATENT DOCUMENTS

EP 1 130 153 A1 9/2001
EP 2311581 A1 4/2011
(Continued)

OTHER PUBLICATIONS

International Search Report (PCT/ISA/210) issued on Jul. 29, 2024 by the International Searching Authority in International Patent Application No. PCT/KR2024/004625.
(Continued)

*Primary Examiner* — Levon J Shahinian
(74) *Attorney, Agent, or Firm* — Sughrue Mion, PLLC

(57) ABSTRACT

Provided is a washing machine including: a storage chamber configured to store carbon dioxide in a gaseous state; an additive container configured to store an additive; a mixing chamber configured to mix the carbon dioxide in the gaseous state supplied from the storage chamber with the additive supplied from the additive container and pressurize the carbon dioxide and the additive, which are mixed with each other, to generate a mixed solution in a liquid state; a washing chamber configured to wash laundry using the mixed solution supplied from the mixing chamber; and a distillation chamber configured to accommodate the mixed solution discharged from the washing chamber and vaporize the carbon dioxide from the mixed solution therein, wherein
(Continued)

1 the additive lowers a vapor pressure of the mixed solution to maintain the mixed solution in a liquid state at pressures of 10 bar or less.

15 Claims, 5 Drawing Sheets

(51) Int. Cl.

| | |
|---|---|
| ***C11D 7/30*** | (2006.01) |
| ***C11D 7/50*** | (2006.01) |
| ***D06F 35/00*** | (2006.01) |
| ***D06F 43/00*** | (2006.01) |
| ***D06F 43/02*** | (2006.01) |
| ***D06F 43/08*** | (2006.01) |
| ***D06L 1/00*** | (2017.01) |
| ***D06L 1/04*** | (2006.01) |
| ***D06L 1/10*** | (2006.01) |

(52) U.S. Cl.

CPC ................ *C11D 7/50* (2013.01); *D06F 35/00* (2013.01); *D06F 43/00* (2013.01); *D06F 43/02* (2013.01); *D06F 43/08* (2013.01); *D06L 1/00* (2013.01); *D06L 1/04* (2013.01); *D06L 1/10* (2013.01)

(56) References Cited

U.S. PATENT DOCUMENTS

| | | | | |
|---|---|---|---|---|
| 6,073,292 | A | 6/2000 | Lindqvist et al. | |
| 6,270,531 | B1 | 8/2001 | DeYoung et al. | |
| 6,461,387 | B1 | 10/2002 | Jureller et al. | |
| 7,481,893 | B2 | 1/2009 | Motson et al. | |
| 7,514,396 | B2 | 4/2009 | Motson et al. | |
| 7,659,354 | B2 | 2/2010 | Song et al. | |
| 2005/0183208 | A1* | 8/2005 | Scheper | D06F 43/02 68/17 R |
| 2006/0289039 | A1 | 12/2006 | Hamrefors et al. | |
| 2009/0069209 | A1 | 3/2009 | Estes et al. | |
| 2009/0178211 | A1 | 7/2009 | Wahl et al. | |
| 2022/0034022 | A1 | 2/2022 | Sorbo et al. | |
| 2022/0154388 | A1 | 5/2022 | Bae et al. | |
| 2022/0204887 | A1 | 6/2022 | Lee et al. | |
| 2022/0235514 | A1 | 7/2022 | Park et al. | |

FOREIGN PATENT DOCUMENTS

| | | | |
|---|---|---|---|
| JP | 2001-51 4339 | A | 9/2001 |
| JP | 2002-004169 | A | 1/2002 |
| JP | 2005-530883 | A | 10/2005 |
| JP | 2005-530884 | A | 10/2005 |
| JP | 2006-516473 | A | 7/2006 |
| JP | 2009-279117 | A | 12/2009 |
| JP | 2010-136860 | A | 6/2010 |
| KR | 10-0131842 | B1 | 12/1997 |
| KR | 10-0432737 | B1 | 5/2004 |
| KR | 10-2005-0090994 | A | 9/2005 |
| KR | 10-2010-0042291 | A | 4/2010 |
| KR | 10-2022-0107558 | A | 8/2022 |
| KR | 10-2022-0107559 | A | 8/2022 |
| KR | 10-2022-0107561 | A | 8/2022 |
| KR | 10-2460178 | B1 | 10/2022 |
| KR | 10-2022-0148776 | A | 11/2022 |
| KR | 10-2472995 | B1 | 12/2022 |
| KR | 10-2504536 | B1 | 2/2023 |
| WO | 2004/082858 | A1 | 9/2004 |

OTHER PUBLICATIONS

Written Opinion (PCT/ISA/237) issued on Jul. 29, 2024 by the International Searching Authority in International Patent Application No. PCT/KR2024/004625.

Extended European Search Report dated Apr. 21, 2026, issued by the European Patent Office in European Application No. 24792915.1.

* cited by examiner

WASHING MACHINE AND METHOD OF CONTROLLING THE SAME

CROSS-REFERENCE TO RELATED APPLICATION(S)

This application is a by-pass continuation application of International Application No. PCT/KR2024/004625, filed on Apr. 8, 2024, which is based on and claims priority to Korean Patent Application No. 10-2023-0051625, filed on Apr. 19, 2023, and Korean Patent Application No. 10-2024-0001808, filed on Jan. 4, 2024, in the Korean Intellectual Property Office, the disclosures of which are incorporated by reference herein in their entireties.

BACKGROUND

1. Field

The disclosure relates to a washing machine that washes laundry using a mixed solution of carbon dioxide and additives and a method of controlling the same.

2. Description of Related Art

In a recent trend toward eco-friendly and highly energy-efficient cleaning methods, there has been introduction of a cleaning method that uses liquid carbon dioxide instead of various chemical raw materials conventionally used in the existing water washing and dry cleaning. Laundry using liquid carbon dioxide is relatively harmless to the human body and the environment in comparison with water washing and dry cleaning. Additionally, laundry using liquid carbon dioxide allows for low temperature washing, thus providing excellent energy efficiency, and it allows for regeneration and reuse of liquid carbon dioxide after washing, thus increasing laundry turnover rates.

In conventional liquid $CO_2$ washing machines, a high pressure system of 50 bar or higher at room temperature is required to use $CO_2$, which is used as a solvent, in a liquid form. In addition, liquid $CO_2$ washing machines focus on washing oil-soluble contaminants due to the non-polar nature of $CO_2$, thus having limitations in washing water-soluble contaminants.

Despite the advantages above, using liquid carbon dioxide as a washing solvent in conventional liquid $CO_2$ washing machines requires maintaining a high pressure of 50 bar or higher across the entire system, which makes it difficult to design pressure resistance of each component, leading to increased weight and volume of the overall system. In addition, the adoption of high-pressure systems poses challenges for household use due to a large number of safety-related regulations.

SUMMARY

According to an aspect of the disclosure, there is provided a washing machine including: a storage chamber configured to store carbon dioxide in a gaseous state; an additive container configured to store an additive; a mixing chamber configured to mix the carbon dioxide in the gaseous state supplied from the storage chamber with the additive supplied from the additive container and pressurize the carbon dioxide and the additive, which are mixed with each other, to generate a mixed solution in a liquid state; a washing chamber configured to wash laundry using the mixed solution supplied from the mixing chamber; and a distillation chamber configured to accommodate the mixed solution discharged from the washing chamber and vaporize the carbon dioxide from the mixed solution therein, wherein the additive lowers a vapor pressure of the mixed solution to maintain the mixed solution in a liquid state at pressures of 10 bar or less.

According to an aspect of the disclosure, there is provided a method of controlling a washing machine, the method comprising: generating a mixed solution that maintains a liquid state at a pressure of 10 bar or lower using carbon dioxide stored in a storage chamber and additives stored in an additive container; performing a washing cycle by supplying the mixed solution to a washing chamber; discharging the mixed solution from the washing chamber based on completion of the washing cycle, and vaporizing the mixed solution discharged from the washing chamber.

As is apparent from the above, a washing machine in which the internal pressure of a washing chamber is controlled to 10 bar or lower by mixing an additive that allows carbon dioxide to remain in a liquid state even at a low vapor pressure, thus enabling a smaller and lighter system, and saving the driving energy, and allowing for household use, and a method of controlling the same can be provided. Further, a washing machine that secures excellent washing power against various types of contamination, and a method of controlling the same can be provided.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
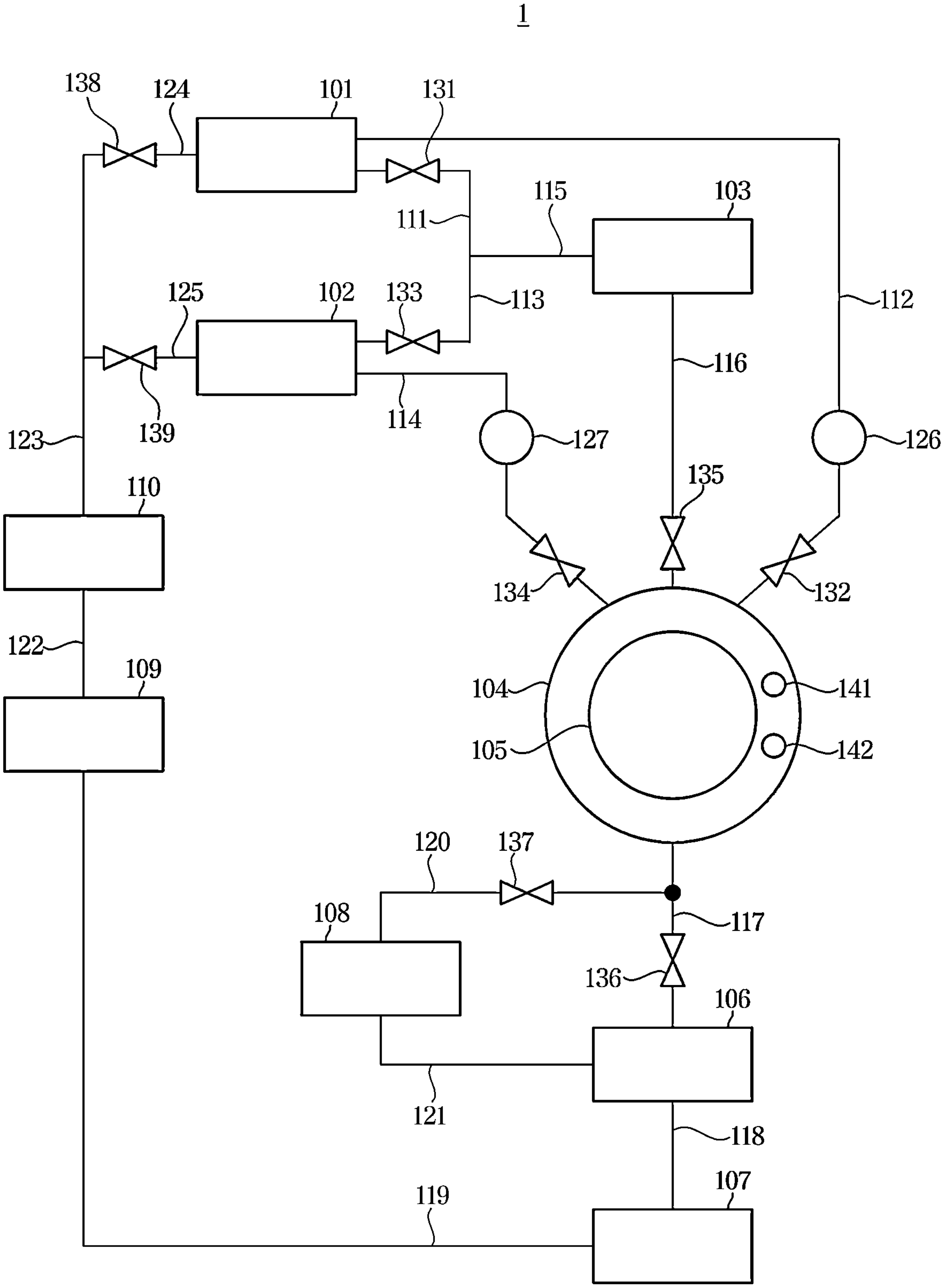
FIG. 1 is a conceptual diagram of a washing machine according to one or more embodiments.

Hereinafter, one or more embodiments will be described. However, the one or more embodiments may be modified in various other forms, and the technical idea of the disclosure is not limited to the one or more embodiments described below. In addition, the one or more embodiments are merely provided as examples to those skilled in the art.

The terms used in this application are only used to describe one or more examples. Thus, for example, a singular expression includes a plural expression, unless the context clearly indicates it. In addition, terms such as "comprise" or "include" as used in the present application are used to clearly indicate the existence of features, steps, functions, elements, or combinations thereof described in the specification, and other features. It should be noted that it is not used to preliminarily exclude the presence of a field or step, function, component, or combination thereof.

On the other hand, unless otherwise defined, all terms used in this specification should be regarded as having the same meaning as generally understood by a person having ordinary skill in the art to which the disclosure pertains. Accordingly, unless explicitly defined herein, certain terms should not be construed in excessively ideal or formal sense. For example, in this specification, a singular expression includes a plural expression unless the context clearly has an exception.

In addition, "about", "substantially" and the like in the present specification are used in the sense of or close to the value based on manufacturing and substance tolerances unique to the stated meaning are presented, and also used to prevent unscrupulous intruders from unscrupulous use of the disclosed content that suggests an absolute value for helping understanding of the present disclosure. In the case of a carbon dioxide washing machine, a pressure greater than or equal to a range of 50 bar to 64.4 bar may be maintained to liquefy carbon dioxide at room temperature. In order to lower the vapor pressure of a solvent A, a method of mixing the solvent A with a solute or a solvent B, which has a vapor pressure lower than that of the solvent A, may be used. In this case, according to Raoult's law, the vapor pressure of the mixture varies depending on the molar ratio of the two solvents, and based on the solvent B, which has a relatively low vapor pressure, being mixed with the solvent A at a molar ratio or more, the vapor pressure of the mixture may be maintained at a pressure or lower.

Accordingly, one or more embodiments use a mixed solution in which an additive having a vapor pressure lower than that of carbon dioxide is mixed with the carbon dioxide to provide the mixed solution with a lowered vapor pressure such that the mixed solution maintains a liquid state at a pressure of 10 bar or lower. In addition, the washing machine is provided with reduced weight and volume, thus achieving miniaturization and light weight, and also the washing machine saves driving energy, thereby obviating the need for a high pressure system to drive the conventional carbon dioxide washing machine.

A washing machine according to one or more embodiments includes a storage chamber configured to store carbon dioxide in a gaseous state; an additive container configured to store an additive; a mixing chamber configured to mix the carbon dioxide in the gaseous state supplied from the storage chamber with the additive supplied from the additive container and pressurize the carbon dioxide and the additive, which are mixed with each other, to generate a mixed solution in a liquid state; a washing chamber configured to wash laundry using the mixed solution supplied from the mixing chamber; and a distillation chamber configured to collect the mixed solution discharged from the washing chamber and vaporize the carbon dioxide from the mixed solution therein, wherein the additive lowers a vapor pressure of the mixed solution to maintain the mixed solution in a liquid state at pressures of 10 bar or less.

Hereinafter, a washing machine according to one or more embodiments is described in detail with reference to the accompanying drawings.

FIG. 1 is a conceptual diagram of a washing machine according to one or more embodiments.

A washing machine 1 according to one or more embodiments may be configured to wash laundry using carbon dioxide.

Referring to FIG. 1, the washing machine 1 according to one or more embodiments may include a storage chamber 101, an additive container 102, a mixing chamber 103, a washing chamber 104, a drum 105, a pump 107, and a distillation chamber 109. The washing machine 1 may further include a cooling chamber 110, a reserve chamber 108, and a filter 106. In addition, the washing machine 1 may further include the $1^{st}$ to $15^{th}$ passages 111 to 125 connecting the chambers, the $1^{st}$ to $9^{th}$ valves 131 to 139 provided in the $1^{st}$ to $15^{th}$ passages, and a first injector 126 and a second injector 127. Additionally, the washing machine 1 may further include a sensor 141 and a heater 142.

The storage chamber 101 may be configured to store gaseous carbon dioxide. The pressure inside the storage chamber 101 may be maintained at about 50 bar or higher to store liquid carbon dioxide inside the storage chamber 101 at room temperature. Since such a high-pressure chamber has a risk of explosion, the storage chamber 101 of the washing machine 1 according to one or more embodiments may be provided to store gaseous carbon dioxide.

The gaseous carbon dioxide stored in the storage chamber 101 may be supplied to the washing chamber 104 or the mixing chamber 103. The carbon dioxide stored in the storage chamber 101 may be supplied to the washing chamber 104 through the second passage 112 or to the mixing chamber 103 through the $1^{st}$ passage 111 and the $5^{th}$ passage 115. In order to supply the carbon dioxide stored in the storage chamber 101 to the washing chamber 104, a first injector 126 may be provided in the second passage 112 connecting the storage chamber 101 and the washing chamber 104.

The storage chamber 101 may be configured to store gaseous carbon dioxide vaporized in the distillation chamber 109. Carbon dioxide supplied from the storage chamber 101 to the washing chamber 104 may be transferred to the storage chamber 101 by passing through the distillation chamber 109. Carbon dioxide in a mixed solution supplied from the mixing chamber 103 to the washing chamber 104 may be transferred to the storage chamber 101 by passing through the distillation chamber 109.

The additive container 102 may be provided to store an additive that is to be mixed with carbon dioxide and allows the carbon dioxide to be liquefied at 10 bar or lower. The additive may be mixed with carbon dioxide and lower the vapor pressure of the carbon dioxide. To this end, the additive may have a vapor pressure lower than that of the carbon dioxide. The additive may include a solvent that has low reactivity with carbon dioxide or that is not reactive with carbon dioxide.

The additive may be a solvent other than carbon dioxide, and may include a solvent that operates to lower the vapor pressure of the carbon dioxide based on being mixed with carbon dioxide. The additive may be mixed with the carbon dioxide and then pressurized to form a mixed solution. Due to the additive, the mixed solution is provided with a vapor pressure lower than that of the carbon dioxide, and remain in a liquid state, for example, at a pressure of 10 bar or lower.

The additive stored in the additive container 102 in a liquid state may be supplied to the washing chamber 104 or the mixing chamber 103. The liquid additive stored in the additive container 102 may be supplied to the mixing chamber 103 through the $3^{rd}$ passage 113 and the $5^{th}$ passage 115. The liquid additive stored in the additive container 102 may be supplied to the washing chamber 104 through the $4^{th}$ passage 114. In order to supply the additive stored in the additive container 102 to the washing chamber 104, a second injector 127 may be provided in the $4^{th}$ passage 114 connecting the additive container 102 and the washing chamber 104.

The mixing chamber 103 may generate a liquid state mixed solution in which carbon dioxide and additive are mixed. To this end, the mixing chamber 103 may be supplied with carbon dioxide from the storage chamber 101. The mixing chamber 103 may be supplied with additive from the additive container 102.

The carbon dioxide delivered from the storage chamber 101 and the additive delivered from the additive container 102 may be mixed inside the mixing chamber 103. Thereafter, through increasing pressure inside the mixing chamber 103, a mixed solution may be generated inside the mixing chamber 103. As will be described below, the pressure at which gaseous carbon dioxide is liquefied may be lowered by the additive, so that a mixed solution may be generated even under pressure conditions of 10 bar or lower.

The mixing chamber 103 may supply the mixed solution to the washing chamber 104.

The washing chamber 104 may be supplied with carbon dioxide from the storage chamber 101, an additive from the additive container 102, and a mixed solution from the mixing chamber 103.

The washing chamber 104 may be supplied with carbon dioxide from the storage chamber 101, an additive from the additive container 102, or a mixed solution from the mixing chamber 103 during one washing cycle.

The timing of receiving carbon dioxide from the storage chamber 101 and the timing of receiving a mixed solution from the mixing chamber 103 may be different from each other.

The timing of receiving an additive from the additive container 102 and the timing of receiving a mixed solution from the mixing chamber 103 may be different from each other.

The timing of receiving carbon dioxide from the storage chamber 101 and the timing of receiving an additive from the additive container 102 may be the same as each other.

The washing chamber 104 may, after receiving the mixed solution, further receive gaseous carbon dioxide from the storage chamber 101 or additives from the additive container 102.

The washing chamber 104 may, after receiving the mixed solution from the mixing chamber 103, further receive a mixed solution from the mixing chamber 103.

The drum 105 may be provided inside the washing chamber 104 and provided to be rotatable inside the washing chamber 104. The drum 105 may rotate clockwise or counterclockwise.

The drum 105 may rotate while changing the rotation speed thereof.

The drum 105 may include a space in which laundry is placed and the laundry is washed.

The drum 105 may include a plurality of holes. The plurality of holes may be passages that allow the mixed solution contained in the washing chamber 104 to flow from inner side to outer side of the drum 105.

The filter 106 may be connected to the washing chamber 104 and may be a space through which the mixed solution discharged from the washing chamber 104 may pass. When the mixed solution discharged from the washing chamber 104 passes through the filter 106, part of contaminants separated from the laundry may be filtered out by the filter 106. The part of the contaminants may be collected within the filter 106.

The filter 106 may include fine holes. The filter 106 may include one, or two or more filters.

The pump 107 may be connected to the washing chamber 104. The pump 107 may pump the mixed solution contained in the washing chamber 104 such that the mixed solution in the washing chamber 104 is discharged to the outside of the washing chamber 104. The mixed solution discharged from the washing chamber 104 by the pumping operation of the pump 107 may be delivered to the distillation chamber 109.

According to one or more embodiments, the additive container 102 may be arranged at a position higher than that of the washing chamber 104 or the mixing chamber 103. The cooling chamber 110 may be arranged at a position higher than that of additive container 102.

With such an arrangement, the additive changed to a liquid state in the cooling chamber 110 may be moved to the additive container 102 by gravity, and the additive stored in the additive container 102 may be moved to the washing chamber 104 or the mixing chamber 103 by gravity. In order to move the mixed solution inside the washing chamber 104 to the distillation chamber 109 located at a higher position than the washing chamber 104, the washing machine 1 may include the pump 107. The pump 107 may move the mixed solution inside the washing chamber 104 to the distillation chamber 109.

In a case in which the washing machine 1 is provided with the filter 106, the pump 107 may be connected to the filter 106. The mixed solution discharged from the washing chamber 104 by the pumping operation of the pump 107 may be delivered to the distillation chamber 109 by passing through the filter 106.

The reserve chamber 108 may store the mixed solution discharged from the washing chamber 104 for the pressure control of the washing chamber 104. At least a portion of the mixed solution in the washing chamber 104 may be discharged into the reserve chamber 108 and thus the pressure inside the washing chamber 104 may be lowered. After discharging the mixed solution inside the washing chamber 104 to the reserve chamber 108, gaseous carbon dioxide may be supplied from the storage chamber 101 into the washing chamber 104 and thus the fraction of carbon dioxide in the mixed solution inside the washing chamber 104 and the pressure inside the washing chamber 104 may be adjusted.

The reserve chamber 108 may be connected to the filter 106 or the distillation chamber 109.

In a case in which the reserve chamber 108 is connected to the distillation chamber 109, the reserve chamber 108 may deliver the mixed solution to the distillation chamber 109.

In a case in which the reserve chamber 108 is connected to the filter 106, the mixed solution discharged from the reserve chamber 108 may be delivered to the distillation chamber 109 by passing through the filter 106. When the mixed solution discharged from the reserve chamber 108 passes through the filter 106, part of contaminants contained in the mixed solution may be filtered out by the filter 106.

The reserve chamber 108 may also be connected to the pump 107. In this case, the mixed solution stored in the reserve chamber 108 may be discharged from the reserve chamber 108 and delivered to the distillation chamber 109 by the pumping operation of the pump 107.

The distillation chamber 109 may store the mixed solution having been stored in the washing chamber 104 and the mixed solution having been stored in the reserve chamber 108. The distillation chamber 109 may perform distillation by vaporizing the mixed solution inside the distillation chamber 109.

The distillation chamber 109 may be supplied with the mixed solution pumped by the pump 107 and also supplied with the mixed solution filtered by the filter 106.

By lowering the pressure inside the distillation chamber 109, carbon dioxide may be separated from the mixed solution. When the pressure inside the distillation chamber

109 is lowered, the liquid carbon dioxide in the mixed solution vaporizes and becomes gaseous carbon dioxide. Through this, carbon dioxide may be separated from the mixed solution. The gaseous carbon dioxide may be transferred to the storage chamber 101 through the 12$^{th}$ passage 122, the 13$^{th}$ passage 123, and the 14$^{th}$ passage 124. In this case, the 8$^{th}$ valve 138 may be opened and the 9$^{th}$ valve 139 may be closed.

After separating carbon dioxide from the mixed solution inside the distillation chamber 109, contaminants may be separated from the mixed solution inside the distillation chamber 109. When the temperature inside the distillation chamber 109 is raised to vaporize the liquid additive in the mixed solution, the additives are vaporized, leaving contaminants contained in the mixed solution inside the distillation chamber 109, and the additives move to the cooling chamber 110 in a gaseous state.

The gaseous additives moved to the cooling chamber 110 may be liquefied in the cooling chamber 110 and then transferred to the additive container 102. The liquid additive liquefied in the cooling chamber 110 may be transferred to the additive container 102 by passing through the 13$^{th}$ passage 123 and the 15$^{th}$ passage 125. In this case, the 9$^{th}$ valve 139 may be opened and the 8$^{th}$ valve 138 may be closed.

With such a configuration, contaminants may be separated from the mixed solution. The washing machine 1 may further include a contamination chamber that stores contaminants separated from the mixed solution by distillation of the mixed solution in the distillation chamber 109.

As described above, the distillation chamber 109 may separate the mixed solution into carbon dioxide and additives. Inside the distillation chamber 109, the carbon dioxide and the additives may be separated using the difference in boiling points between the carbon dioxide and the additives. The boiling point of the carbon dioxide is lower than room temperature. If the pressure inside the distillation chamber 109 is lowered, liquid carbon dioxide, which has a boiling point lower than room temperature, is vaporized.

Although it depends on the physical properties of the additives, the boiling points of the additives according to one or more embodiments is higher than the boiling point of the carbon dioxide, and may be 40° C. or lower. In this case, after all of the carbon dioxide with a low boiling point has vaporized, the temperature inside the distillation chamber 109 may be raised to the boiling point of the additives such that the additive is vaporized. The gaseous carbon dioxide may be transferred to the storage chamber 101 by passing through the cooling chamber 110 or without passing through the cooling chamber 110. The reason why gaseous carbon dioxide does not need to pass through the cooling chamber 110 is that carbon dioxide is not liquefied even by passing through the cooling chamber 110, which is not a high pressure chamber, because the melting point of carbon dioxide is lower than the temperature inside the cooling chamber 110. The additives, which has been vaporized in the distillation chamber 109, may be liquefied in the cooling chamber 110 and then transferred to the additive container 102. Meanwhile, the additives may vaporize, allowing contaminants contained in the mixed solution to be separated. The separated contaminants may be discharged to the contamination chamber.

The carbon dioxide liquefied in the cooling chamber 110 may be delivered to the storage chamber 101, and the additives liquefied in the cooling chamber 110 may be delivered to the additive container 102.

The washing machine 1 according to one or more embodiments may not include the cooling chamber 110. For example, the washing machine 1 may not include the cooling chamber 110 based on the boiling point of the additive being higher than 40° C. In this case, the carbon dioxide is vaporized as the pressure inside the distillation chamber 109 is reduced, which allows the carbon dioxide to be separated from the mixed solution. The liquid additives may be directly transferred to the additive container 102 or discharged outside the washing machine 1 without being subject to vaporization and liquefaction. According to one or more embodiments, it is also possible for the additive container 102 to operate as a cooling chamber 110.

Hereinafter, the 1$^{st}$ to 15$^{th}$ passages 111 to 125 according to one or more embodiments, the 1$^{st}$ to 9$^{th}$ valves 131 to 139 provided in the 1$^{st}$ to 15$^{th}$ passages, and the first injector 126, the second injector 127, the sensor 141, and the heater 142 are described.

The 1$^{st}$ passage 111 may be connected to the storage chamber 101 and may be a passage through which carbon dioxide in the storage chamber 101 moves.

The 2$^{nd}$ passage 112 may be provided between the storage chamber 101 and the washing chamber 104, and may be a passage that directly supplies carbon dioxide from the storage chamber 101 to the washing chamber 104.

The 3$^{rd}$ passage 113 may be connected to the additive container 102 and may be a passage through which the additives of the additive container 102 move.

The 4$^{th}$ passage 114 may be provided between the additive container 102 and the washing chamber 104, and may be a passage that directly supplies the additives in the additive container 102 to the washing chamber 104.

The 5$^{th}$ passage 115 may be connected to the 1$^{st}$ passage 111 and the 3$^{rd}$ passage 113, and may be connected to the mixing chamber 103.

The 5$^{th}$ passage 115 may be a connecting passage connecting the 1$^{st}$ passage 111 and the 3$^{rd}$ passage 113.

The 5$^{th}$ passage 115 may receive carbon dioxide through the 1$^{st}$ passage 111 and additives through the 3$^{rd}$ passage 113.

The 5$^{th}$ passage 115 may deliver carbon dioxide to the mixing chamber 103 and deliver additives to the mixing chamber 103.

The 6$^{th}$ passage 116 may be provided between the mixing chamber 103 and the washing chamber 104.

The 6$^{th}$ passage 116 may deliver the mixed solution mixed in the mixing chamber 103 to the washing chamber 104. The 6$^{th}$ passage 116 may be a mixing passage through which the mixed solution flows.

The 7$^{th}$ passage 117 may be connected to the washing chamber 104.

The 7$^{th}$ passage 117 may be a passage connected to the pump 107 and through which the mixed solution of the washing chamber 104 pumped by the pumping operation of the pump 107 flows. The 7$^{th}$ passage 117 may be a drain pipe through which the mixed solution in the washing chamber 104 is discharged.

In a case in which the washing machine 1 is provided with a filter 106, the 7$^{th}$ passage 117 may be connected to the filter 106 and may be a passage allowing the mixed solution discharged from the washing chamber 104 by pumping of the pump 107 to be delivered to the filter 106.

The 8$^{th}$ passage 118 may be provided between the filter 106 and the pump 107. The 8$^{th}$ passage 118 may allow the mixed solution filtered by the filter 106 to flow to the pump 107.

The 9$^{th}$ passage 119 may connect the pump 107 and the distillation chamber 109.

The 9$^{th}$ passage 119 may allow the mixed solution pumped by the pump 107 to flow into the distillation chamber 109.

The 9$^{th}$ passage 119 may allow the mixed solution stored in the reserve chamber 108 to flow to the distillation chamber 109.

The 10$^{th}$ passage 120 is a passage provided between the washing chamber 104 and the reserve chamber 108.

The 10$^{th}$ passage 120 may allow the mixed solution discharged from the washing chamber 104 to flow into the reserve chamber 108.

The 11$^{th}$ passage 121 may be provided between the reserve chamber 108 and the filter 106.

The 11$^{th}$ passage 121 may allow the mixed solution discharged from the reserve chamber 108 to flow to the filter 106 such that contaminants in the mixed solution are filtered out by the filter 106.

The 12$^{th}$ passage 122 may be provided between the distillation chamber 109 and the cooling chamber 110.

The 12$^{th}$ passage 122 may allow the additive vaporized in the distillation chamber 109 to flow into the cooling chamber 110.

The 13$^{th}$ passage 123 may be connected to the cooling chamber 110.

The 13$^{th}$ passage 123 is a passage through which carbon dioxide and additive, which is liquefied in the cooling chamber 110, flow.

The 14$^{th}$ passage 124 may be provided between the 13$^{th}$ passage 123 and the storage chamber 101.

The 14$^{th}$ passage 124 may guide carbon dioxide delivered from the 13$^{th}$ passage 123 to the storage chamber 101. Through this, carbon dioxide used in washing may be stored back in the storage chamber 101.

The 15$^{th}$ passage 125 may be provided between the 13$^{th}$ passage 123 and the additive container 102.

The 15$^{th}$ passage 125 may guide the additive delivered from the 13$^{th}$ passage 123 to the storage chamber 101. Through this, the additive used in washing may be stored back in the additive container 102.

The first injector 126 may be connected to the 2$^{nd}$ passage 112. The first injector 126 may be provided in the washing chamber 104. The first injector 126 may inject gaseous carbon dioxide moving through the 2$^{nd}$ passage 112 into the washing chamber 104.

The second injector 127 may be connected to the 4$^{th}$ passage 114. The second injector 127 may be provided in the washing chamber 104. The second injector 127 may inject the additive moving through the 4$^{th}$ passage 114 into the washing chamber 104.

The 1$^{st}$ valve 131 is provided in the 1$^{st}$ passage 111 to open or close the 1$^{st}$ passage 111. By opening the 1$^{st}$ valve 131, carbon dioxide may be supplied from the storage chamber 101 to the mixing chamber 103, and by closing the 1$^{st}$ valve 131, supply of carbon dioxide from the storage chamber 101 to the mixing chamber 103. may be blocked.

The 2$^{nd}$ valve 132 may be provided in the 2$^{nd}$ passage 112 to open or close the 2$^{nd}$ passage 112. By opening the 2$^{nd}$ valve 132, carbon dioxide may be supplied from the storage chamber 101 to the washing chamber 104, and by closing the 2$^{nd}$ valve 132, supply of carbon dioxide from the storage chamber 101 to the washing chamber 104 may be blocked.

The 3$^{rd}$ valve 133 may be provided in the 3$^{rd}$ passage 113 to open or close the 3$^{rd}$ passage 113. By opening the 3$^{rd}$ valve 133, the additive may be supplied from the additive container 102 to the mixing chamber 103, and by closing the 3$^{rd}$ valve 133, supply of the additive from the additive container 102 to the mixing chamber 103 may be blocked.

The 4$^{th}$ valve 134 may be provided in the 4$^{th}$ passage 114 to open or close the 4$^{th}$ passage 114. By opening the 4$^{th}$ valve 134, the additive may be supplied from the additive container 102 to the washing chamber 104, and by closing the 4$^{th}$ valve 134, supply of the additive from the additive container 102 to the washing chamber 104 may be blocked.

The 5$^{th}$ valve 135 may be provided in the 6$^{th}$ passage 116 to open or close the 6$^{th}$ passage 116. By opening the 5$^{th}$ valve 135, the mixed solution may be supplied from the mixing chamber 103 to the washing chamber 104, and by closing the 5$^{th}$ valve 135, supply of the mixed solution from the mixing chamber 103 to the washing chamber 104 may be blocked.

The 6$^{th}$ valve 136 may be provided in the 7$^{th}$ passage 117 to open or close the 7$^{th}$ passage 117. By opening the 6$^{th}$ valve 136, the mixed solution may be supplied from the washing chamber 104 to the filter 106, and by closing the 6$^{th}$ valve 136, supply of the mixed solution from the washing chamber 104 to the filter 106 may be blocked.

The 7$^{th}$ valve 137 may be provided in the 10$^{th}$ passage 120 to open or close the 10$^{th}$ passage 120. By opening the 7$^{th}$ valve 137, the mixed solution may be supplied from the washing chamber 104 to the reserve chamber 108, and by closing the 7$^{th}$ valve 137, supply of the mixed solution from the washing chamber 104 to the reserve chamber 108 may be blocked.

The 8$^{th}$ valve 138 may be provided in the 14$^{th}$ passage 124 to open or close the 14$^{th}$ passage 124. By opening the 8$^{th}$ valve 138, carbon dioxide may be introduced from the 13$^{th}$ passage 123 into the storage chamber 101, and by closing the 8$^{th}$ valve 138, introduction of carbon dioxide from the 13$^{th}$ passage 123 to the storage chamber 101 may be blocked. The 9$^{th}$ valve 139 may be provided in the 15$^{th}$ passage 125 to open or close the 15$^{th}$ passage 125. By opening the 9$^{th}$ valve 139, the additive may be introduced from the 13$^{th}$ passage 123 into the additive container 102, and by closing the 9$^{th}$ valve 139, introduction of the additive from the 13$^{th}$ passage 123 to the additive container 102 may be blocked.

The sensor 141 may be provided in the washing chamber 104.

The sensor 141 may detect contaminants contained in the mixed solution in the washing chamber 104 and output contamination information corresponding to the detected contaminants. Here, the contaminants contained in the mixed solution may be contaminants separated from laundry.

The sensor 141 may be a sensor 141 configured to detect contaminants contaminated in laundry. The contamination information output from the sensor 141 may include information for recognizing the type and degree of contamination.

The sensor 141 may include at least one of an optical sensor, an ultrasonic sensor, a thermal conductivity sensor, or an image sensor.

The sensor 141 may include an oil sensor.

The sensor 141 may include a capacitance probe.

The sensor 141 may include a turbidity sensor that detects turbidity of the mixed solution. The turbidity sensor may include an optical sensor. The turbidity of the mixed solution may be a turbidity corresponding to the degree of contamination of the laundry.

When the sensor 141 is an optical sensor, the sensor may detect the intensity of light reflected from the mixed solution and output a voltage corresponding to the intensity of the detected light as contamination information. The intensity of reflected light may vary depending on the type of contaminant.

When the sensor 141 is an ultrasonic sensor, the sensor 141 may output a ultrasonic transmission time and a ultrasonic reception time as contamination information.

When the sensor 141 is a thermal conductivity sensor, the sensor 141 may output a detected thermal conductivity as contamination information.

When the sensor 141 is an image sensor, the sensor 141 may output image information of a mixed solution containing contaminants as contamination information.

When the sensor 141 is a capacitance probe, the sensor 141 may output a voltage corresponding to a dielectric constant as contamination information. The dielectric constants may vary depending on the oil-soluble or water-soluble contaminant.

The sensor 141 may include a pressure sensor that measures the pressure inside the washing chamber 104.

The heater 142 may be provided in the washing chamber 104. The heater 142 may increase the internal temperature of the washing chamber 104. As the temperature inside the washing chamber 104 is increased by the heater 142, the pressure inside the washing chamber 104 may increase. The heater 142 may operate based on laundry in the washing chamber 104 being dried.

The heater 142 may be provided in the washing chamber 104 to control temperature and pressure inside the washing chamber 104, and dry laundry.

The heater 142 for controlling the temperature and pressure inside the washing chamber 104 and the heater for drying laundry may be separate heaters.

The washing chamber 104 may include one, or two or more heaters.

According to one or more embodiments, the washing machine 1 may include a heat pump 109*a*. A condenser of the heat pump 109*a* may be used as a heat source for the distillation chamber 109, and an evaporator of the heat pump 109*a* may be used as a cooling device for the cooling chamber 110.

Figure 2:
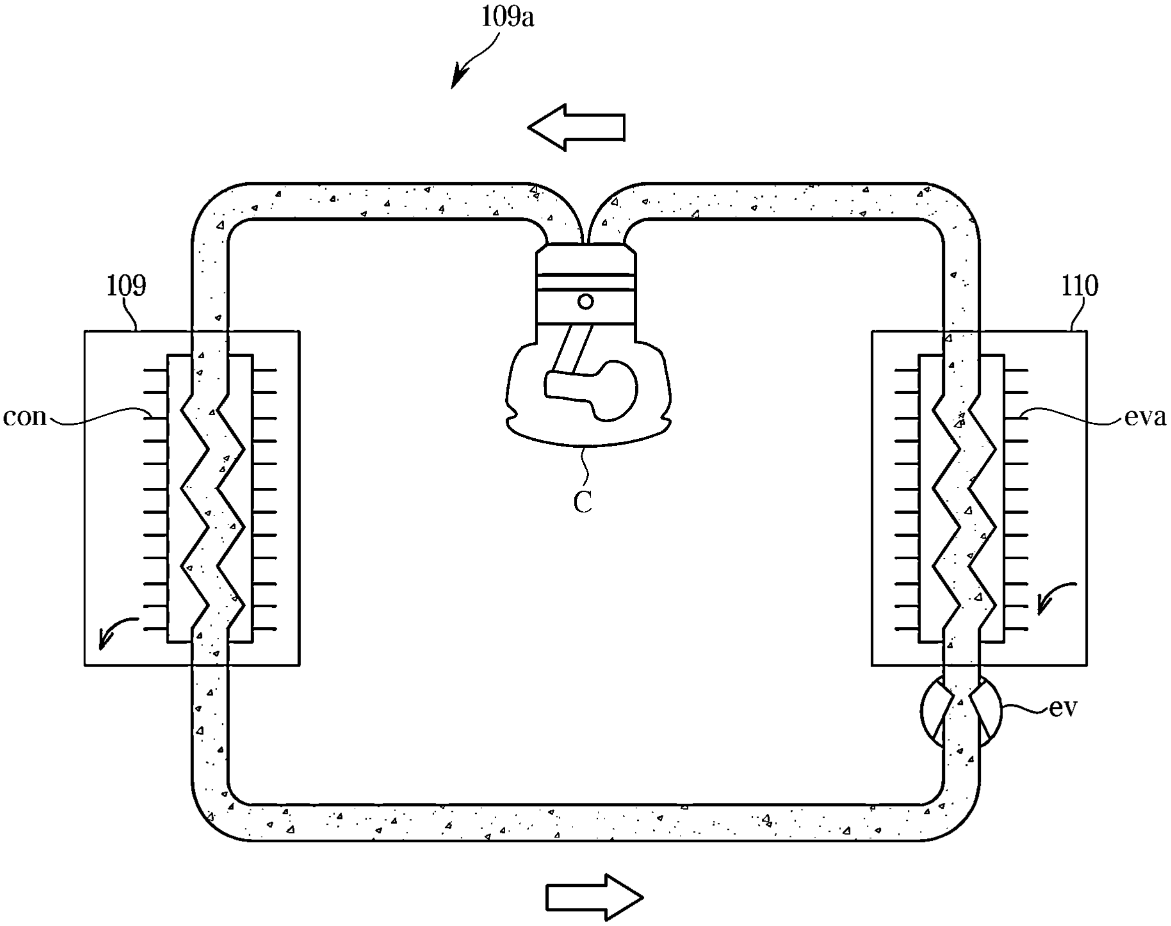
FIG. 2 is an exemplary diagram illustrating a heat pump provided in a washing machine according to one or more embodiments.

FIG. 2 is an exemplary diagram illustrating a heat pump provided in a washing machine according to one or more embodiments.

Referring to FIG. 2, a heat pump 109*a* may include a compressor c, an expansion valve ev, a condenser con, and an evaporator eva.

The compressor C suctions a refrigerant vaporized in the evaporator eva.

The compressor C compresses the suctioned refrigerant and delivers the compressed refrigerant to the condenser con. The compressed refrigerant may be a high-temperature, high-pressure gaseous refrigerant.

The condenser con is connected between the compressor C and the expansion valve ev, and receives the compressed refrigerant from the compressor c. The refrigerant in the condenser con may be subject to heat-exchange with the mixed solution, thereby be liquefied.

The condenser con may perform phase change on the refrigerant supplied from the compressor C into a high-temperature, high-pressure liquid refrigerant.

The condenser con delivers the high-temperature, high-pressure liquid refrigerant to the expansion valve ev.

The expansion valve ev lowers the pressure of the refrigerant supplied from the condenser con through a throttling operation. The expansion valve ev delivers the depressurized refrigerant to the evaporator.

The evaporator eva performs phase-change on the refrigerant supplied from the expansion valve ev into a gaseous state and delivers the phase-changed refrigerant to the compressor c. The refrigerant passed through the evaporator eva may be a low-temperature, low-pressure gaseous refrigerant. The refrigerant in the evaporator eva may be subject to heat exchange with the mixed solution and thereby be vaporized. The refrigerant in the evaporator eva may evaporate on its own while absorbing heat for evaporation from the mixed solution.

The condenser con may be provided in the distillation chamber 109, and the evaporator eva may be provided in the cooling chamber 110.

The mixed solution in the distillation chamber 109 may be heated through heat exchange with the refrigerant in the condenser con. The mixed solution in the distillation chamber 109 may be vaporized by heat emitted from the condenser con.

The mixed solution in the cooling chamber 110 may be cooled through heat exchange with the refrigerant of the evaporator eva to thereby be liquefied.

Hereinafter, the mixed solution of additives and carbon dioxide used in the washing machine 1 according to one or more embodiments as described above will be described in detail.

The mixed solution of additive and carbon dioxide may have a wetting index greater than or equal to 40, the wetting index expressed by Equation 1 below.

$$(\text{wetting index}) = \frac{\text{density}}{\text{viscosity}} \times (\text{surface tension}) \times 1000 \quad \text{[Equation 1]}$$

When the wetness index is less than 40, the mixed solution may have a difficulty in serving as a washing solvent, and thus the efficiency of removing contaminants from laundry may be reduced.

The additive may include an additive having a wetness index greater than or equal to 40 and a boiling point lower than or equal to 40° C. or higher than 40° C.

The additive having a wetness index greater than or equal to 40 and a boiling point lower than or equal to 40° C. may include any one of an additive having lipophilicity and non-flammability or diethyl ether.

The additive having lipophilicity and non-flammability may include any one of a mixture of methyl nonafluoroisobutyl ether and methyl nonafluorobutyl ether, a mixture of trans-1-chloro-3,3,3-trifluoropropene and trans-1,2-dichloroethylene, cis-1,1,1,4,4,4-hexafluoro-2-Butene, 1,1,1,2,2,4,5,5,5-nonafluoro-4-(trifluoromethyl)-3-pentanone or methyl perfluoropropyl ether.

The additive, having a wetness index greater than or equal to 40 and a boiling point higher than 40° C., may include any one of an amphiphilic additive, a lipophilic additive, or an additive having lipophilicity and silicone-based affinity.

The amphiphilic additive is an additive that has both hydrophilic and lipophilic properties, and may include any one of ethanol, methanol, or isopropanol.

The lipophilic additive may include any one of hexadecane, tetradecane, decane, nonane, or N-undecane.

The additive having lipophilicity and silicone-based affinity may include any one of octamethylcyclotetrasiloxane or decamethylcyclopentasiloxane.

The additive is mixed with carbon dioxide to form a mixed solution, and the additive may be contained in an amount of 84.0 mol % or more in the mixed solution. That is, the mixed solution may contain carbon dioxide in an amount of 16 mol % or less.

By including the above described additive, the carbon dioxide washing machine 1 may be driven at a driving pressure of 10 bar or lower.

When the additive is a lipophilic and non-flammable additive or diethyl ether with a wettability index greater than or equal to 40 and a boiling point lower than or equal to 40° C., the additive may be included in the mixed solution in an amount of 84.3 mol % or more. In addition, the additive may be included in the mixed solution in an amount of 84.0 mol % based on the additive being an amphiphilic additive with a wetting index greater than or equal to 40 and a boiling point higher than 40° C. In addition the additive may be included in the mixed solution in an amount of 84.0 mol % or more based on the additive being a lipophilic additive with a wetness index greater than or equal to 40 and a boiling point higher than 40° C., and based on the additive being a lipophilic and silicone-based affinity additives, the additive may be included in the mixed solution in an amount of 84.5 mol %.

After the laundry cycle using the mixed solution is completed, contaminants of the mixed solution may be separated through vaporization. That is, the mixed solution may, through vaporization, leave contaminants contained in the liquid state mixed solution, and the mixed solution in a gaseous state may be separated from the contaminants The vaporization may be performed at a temperature lower than or equal to 40° C.

With a vaporization at the temperature lower than or equal to 40° C., lipophilic and non-flammable additives and diethyl ether with a boiling point lower than or equal to 40° C. among additives used for the mixed solution may be vaporized and separated from the mixed solution, and amphiphilic additives, lipophilic additives, and additives having lipophilicity and silicone-based affinity with a boiling point higher than 40° C. remain in a liquid state without being vaporized in the process of vaporization.

In addition, a method of controlling the washing machine 1 using the mixed solution of additive and carbon dioxide according to one or more embodiments is described.

Figure 3:
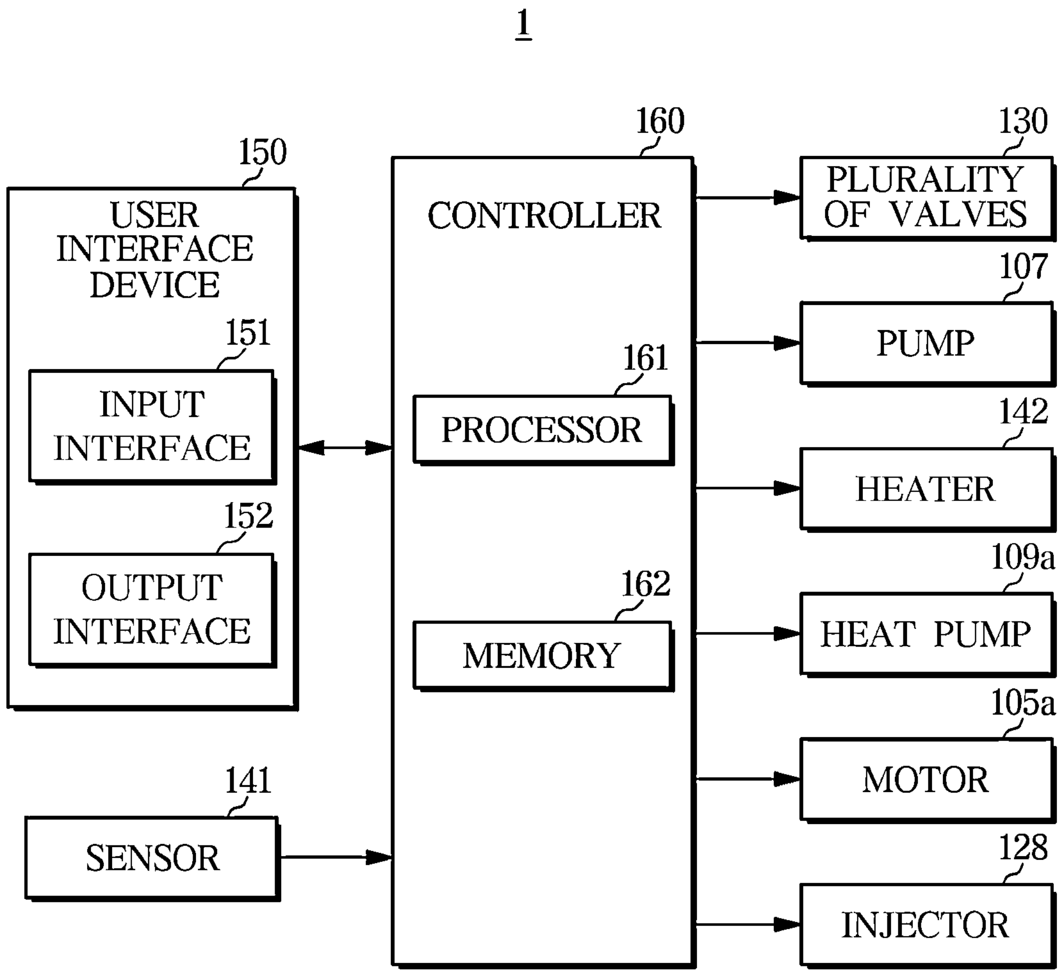
FIG. 3 is a block diagram illustrating an example of components of a washing machine according to one or more embodiments.

Hereinafter, the washing machine 1 according to one or more embodiments will be described in detail with reference to the accompanying drawings. FIG. 3 is a block diagram illustrating an example of a configuration of a washing machine according to one or more embodiments.

Referring to FIG. 3, the washing machine 1 according to one or more embodiments may include a user interface device 150, a sensor 141, a plurality of valves 130, a pump 107, a heater 142, a heat pump 109*a*, an injector 128, a motor 105*a*, or a controller 160.

The user interface device 150 may provide a user interface for interaction between a user and the washing machine 1.

The user interface device 150 may include at least one input interface 151 and at least one output interface 152.

The at least one input interface 151 may convert sensory information received from the user into an electrical signal.

The at least one input interface 151 may include a power button, an operation button, a course selection dial (or a course selection button), and wash/rinse/spin setting buttons. The at least one input interface 151 may include, for example, a tact switch, a push switch, a slide switch, a toggle switch, a micro switch, a touch switch, a touch pad, a touch screen, a jog dial, or a microphone, and the like.

The at least one output interface 152 may generate sensory information to transmit various types of information related to the operation of the washing machine 1 to the user.

For example, the at least one output interface 152 may transmit information related to the washing course, the operation time of the washing machine 1, and wash settings/rinse settings/spin settings to the user. The information about the operation of the washing machine 1 may be output through a screen, an indicator, or speech, for example. The at least one output interface 152 may include, for example, a liquid crystal display (LCD) panel, a light emitting diode (LED) panel, or a speaker, for example.

The sensor 141 may include a contamination level sensor for detecting contaminants in laundry or a pressure sensor for measuring the pressure inside the washing chamber 104.

Sensor data collected from the sensor 141 may be transmitted to the controller 160.

The plurality of valves 130 are provided in the $1^{st}$ to $15^{th}$ passages 111 to 125 to open and close the $1^{st}$ to $15^{th}$ passages 111 to 125.

The plurality of valves 130 may include $1^{st}$ to $9^{th}$ valves 131 to 139.

According to one or more embodiments, one or more valves among the plurality of valves 130 may be omitted, and one or more valves among the plurality of valves 130 may be replaced with injectors.

The controller 160 may control the plurality of valves 130.

The plurality of valves 130 may open or close the $1^{st}$ to $15^{th}$ passages 111 to 125 according to a control signal from the controller 160.

The controller 160 may control the plurality of valves 130 such that the mixed solution generated in the mixing chamber 103 is supplied to the washing chamber 104 in a liquefied state at a pressure of 10 bar or lower.

Here, the controlling, by the controller 160, of the plurality of valves 130 may include controlling one or more valves among the plurality of valves 130.

Here, the controlling, by the controller 160, of the plurality of valves 130 may include controlling the opening time or the opening degree of the plurality of valves 130.

The pump 107 may pump the mixed solution contained in the washing chamber 104 such that the mixed solution in the washing chamber 104 is discharged to the outside of the washing chamber 104. The controller 160 may control the pump 107.

The pump 107 may pump the mixed solution contained in the washing chamber 104 according to a control signal from the controller 160.

According to one or more embodiments, the pump 107 may be omitted based on the boiling point of the additive being at a temperature (e.g., 60° C. or lower) that causes damage to the fabric.

The heater 142 may increase the internal temperature of the washing chamber 104. The controller 160 may control the heater 142.

The heater 142 may heat the inside of the washing chamber 104 according to a control signal from the controller 160.

The heat pump 109*a* may include a compressor c, an expansion valve ev, a condenser con, and an evaporator eva. The controller 160 may control the compressor c.

The compressor C may compress the refrigerant according to a control signal from the controller 160.

When the compressor C operates, the condenser may be used as a heat source for the distillation chamber 109, and the evaporator may be used as a cooling device for the cooling chamber 110.

According to one or more embodiments, the evaporator may be used as a cooling device for the additive container 102.

The motor 105*a* may rotate the drum 105.

The controller 160 may control the motor 105*a*.

The motor 105*a* may rotate the drum 105 according to a control signal from the controller 160.

The injector 128 may include a first injector 126 that injects gaseous carbon dioxide moving through the 2nd passage 112 into the washing chamber 104 and a second injector 127 that injects an additive moving through the 4th passage 114 into the washing chamber 104. According to one or more embodiments, one valve (e.g., the 8th valve 138) among the plurality of valves 130 may be replaced with the injector 128.

The controller 160 may control the injector 128.

The controller 160 may control various components (e.g., the plurality of valves 130, the pump 107, the heater 142, the heat pump 109*a*, or the motor 105*a*) of the washing machine 1. The controller 160 may control various components of the washing machine 1 to perform at least one cycle including water supply, washing, rinsing, or dehydration according to user input. For example, the controller 160 may control the motor 105*a* to adjust the rotation speed of the drum 105, or control the plurality of valves 130 or the injector 128 to supply the mixed solution to the washing chamber 104, control the plurality of valves 130 or the pump 107 to discharge the mixed solution from the washing chamber 104 to the outside, or control the heat pump 109*a* to heat the distillation chamber 109 or cool the cooing chamber 110 (or the additive container 102), or control the heater 142 to heat the washing chamber 104.

The controller 160 may include hardware, such as a CPU, Micom, or memory, and software, such as a control program. For example, the controller 160 may include at least one memory 162 that stores data in the form of an algorithm for controlling the operation of components of the washing machine 1 and data in the form of a program, and at least one processor 161 that performs the above-described operation and the to-be described operation using the data stored in the at least one memory 162. The memory 162 and the processor 161 may each be implemented as separate chips. The processor 161 may include one, or two or more processor chips, or one or two or more processing cores. The memory 162 may include one, or two or more memory chips or one or two or more memory blocks. Additionally, the memory 162 and processor 161 may be implemented as a single chip.

The memory 162 may store instructions for controlling the operation of components in the washing machine 1. The processor 161 may perform the operations described above and operations described below by executing the instructions stored in the memory 162.

The components described in FIG. 3 are examples of the components of the washing machine 1 according to one or more embodiments, and some components (e.g., the pump 107) among the components shown in FIG. 3 may be omitted, and the washing machine 1 according to one or more embodiments may further include other components (e.g., a communication module for communicating with an external device) in addition to the components shown in FIG. 3.

Figure 4:
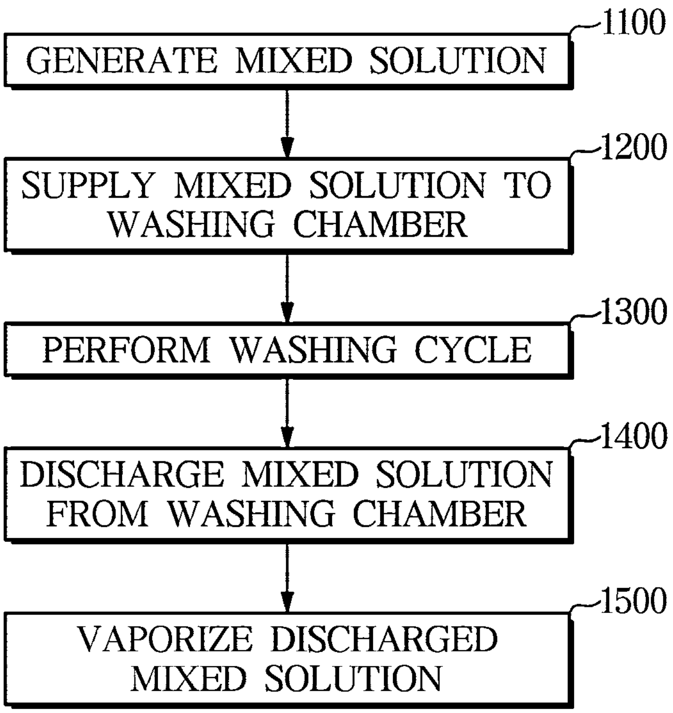
FIG. 4 is a flowchart showing an example of a method of controlling a washing machine according to one or more embodiments.

FIG. 4 is a flowchart showing an example of a method of controlling a washing machine according to one or more embodiments.

Referring to FIG. 4, the washing machine 1 may perform an operation of generating a mixed solution (1110).

According to one or more embodiments, the controller 160 may perform operation 1100 of generating a mixed solution that maintains a liquid state at a pressure of 10 bar or lower during a washing cycle. Here, the mixed solution may contain additives in an amount of 84 mol % or more. That is, the mixed solution may contain carbon dioxide in an amount of 16 mol % or less. The amount of the mixed solution may vary depending on the characteristics (e.g., weight or material) of the laundry, but the ratio of the mole % of the additive and the mole % of the carbon dioxide contained in the mixed solution may be maintained at the ratio described above.

The operation 1100 of generating a mixed solution may include adjusting the ratio of carbon dioxide and additives such that the mixed solution contains the additive in an amount of 84.0 mol % or more.

The controller 160 may, in response to a start of the washing cycle, perform a weight sensing operation to detect the weight of the laundry in the drum 105 or a fabric quality sensing operation to detect the fabric quality of the laundry in the drum 105.

The controller 160 may determine the amount of mixed solution based on the characteristics (e.g., weight, material) of the laundry. The controller 160 may control the plurality of valves 130 to generate the determined amount of mixed solution.

The controller 160 may open the 1st valve 131 for a first predetermined time to allow carbon dioxide stored in the storage chamber 101 to be supplied to the mixing chamber 103, and may open the 3rd valve 133 for a second predetermined time to allow additives stored in the additive container 102 to move to the mixing chamber 103.

According to one or more embodiments, the first predetermined time and the second predetermined time may be different from each other. For example, the first predetermined time and the second predetermined time may be preset as a ratio of time periods such that the mixed solution generated in the mixing chamber 103 contains additives in an amount of 84 mol % or more.

According to one or more embodiments, the first predetermined time and the second predetermined time may be the same, but the opening degree of the 1st valve 131 during the first predetermined time and the opening degree of the 3rd valve 133 during the second predetermined time may be different from each other. For example, the opening degree of the 1st valve 131 and the opening degree of the 3rd valve 133 may be preset to a ratio of the opening degrees such that the mixed solution generated in the mixing chamber 103 contains additives in an amount of 84 mol % or more.

According to one or more embodiments, the first predetermined time and the second predetermined time may be different from each other, and the opening degree of the 1st valve 131 and the opening degree of the 3rd valve 133 may also be different from each other. For example, the first predetermined time, the second predetermined time, and the opening degrees of the 1st valve 131, and the opening degree of the 3r valve 133 may be preset to ratios such that the mixed solution generated in the mixing chamber 103 contains additives in an amount of 84 mole % or more.

The controller 160 may, based on a predetermined time elapsing after closing both the 1st valve 131 and the 3rd valve 133, open the 5th valve 135 such that the mixed solution generated in the mixing chamber 103 may be supplied to the washing chamber 104. Here, the predetermined time may be set in advance as a time that is sufficient to liquefy the mixed solution generated in the mixing chamber 103 at a pressure of 10 bar or lower.

The controller 160 may pressurize the inside of the mixing chamber 103 such that a mixed solution of carbon dioxide and additives is generated in the mixing chamber 103. The pressurizing, by the controller 160, of the inside of the mixing chamber 103 may include supplying carbon dioxide or additives to the mixing chamber 103.

According to one or more embodiments, the 1$^{st}$ valve 131 provided in the passage that supplies gaseous carbon dioxide stored in the storage chamber 101 to the mixing chamber 103 may be replaced with the injector 128, and the controller 160 may control the injector 128 to inject the gaseous carbon dioxide stored in the storage chamber 101 into the mixing chamber 103.

The washing machine 1 may, upon completing the generation of the mixed solution that maintain a liquid state at a pressure of 10 bar or lower, perform an operation of supplying the mixed solution to the washing chamber 104 (1200).

According to one or more embodiments, the controller 160 may, in response to a predetermined time elapsing after both the 1$^{st}$ valve 131 and the 3$^{rd}$ valve 133 are closed, identify that the generation of the mixed solution in the mixing chamber 103 is completed.

According to one or more embodiments, the mixing chamber 103 may be provided with a pressure sensor to detect the pressure of the mixed solution. The controller 160 may, in response to the pressure of the mixed solution falling below 10 bar, identify that the generation of the mixed solution in the mixing chamber 103 is completed.

The controller 160 may, in response to identifying that the generation of the mixed solution is completed, open the 5$^{th}$ valve 135.

The controller 160 may, based on the pressure inside the washing chamber 104 reaching a predetermined pressure (e.g., a predetermined pressure lower than or equal to 10 bar), open the 5$^{th}$ valve 135. The predetermined pressure may be set in advance to an appropriate pressure that may maintain the mixed solution in a liquid state.

The controller 160 may maintain the pressure inside the washing chamber 104 at a 10 bar or below.

A method of the controller 160 adjusting the pressure inside the washing chamber 104 to 10 bar or lower may employ various methods.

For example, the controller 160 may control the opening of the 7$^{th}$ valve 137 such that the mixed solution in the washing chamber 104 is discharged into the reserve chamber 108, to adjust the pressure inside the washing chamber 104.

As another example, the controller 160 may control the operation of the heater 142 to adjust the pressure of the washing chamber 104.

The controller 160 may control the amount of heat generated by the heater 142 or the operation time of the heater 142.

As another example, the controller 160 may control supply of at least one of gaseous carbon dioxide or additives to adjust the pressure of the washing chamber 104.

The controller 160 may control the injector 128 or the plurality of valves 130. According to one or more embodiments, the controller 160 may open the second valve 132, and control the first injector 126 to supply carbon dioxide stored in the storage chamber 101 to the washing chamber 104, thereby supplying carbon dioxide into the washing chamber 104. According to one or more embodiments, the controller 160 may open the 4$^{th}$ valve 134 and control the second injector 127 to supply additives stored in the additive container 102 to the washing chamber 104, thereby supplying the additives to the washing chamber 104.

The controller 160 may control the injector 128 or the plurality of valves 130 such that the mixed solution in the washing chamber 104 contains the additives in an amount of 84.0 mol % or more.

The washing machine 1 may perform a washing cycle to wash laundry stored in the drum 105 in the washing chamber 104 using the mixed solution (1300).

The controller 160 may perform the washing cycle 1300 by rotating the drum 105.

The washing cycle 1300 may be performed based on the internal pressure of the washing chamber 104 being 10 bar or lower.

The controller 160 may identify the pressure inside the washing chamber 104 based on sensor data collected from the sensor 141 during the washing cycle, and control the plurality of valves 130 such that the pressure inside the washing chamber 104 is maintained at a predetermined pressure of 10 bar or lower.

For example, the controller 160 may control opening of the 7$^{th}$ valve 137 such that the mixed solution in the washing chamber 104 is discharged to the reserve chamber 108 to maintain the pressure inside the washing chamber 104 at a pressure of 10 bar or lower during the washing cycle.

As another example, the controller 160 may supply carbon dioxide stored in the storage chamber 101 to the washing chamber 104 or supply additives stored in the additive container 102 to the washing chamber 104 to maintain the pressure inside the washing chamber 104 at a pressure of 10 bar or lower during the washing cycle.

The controller 160 may control the first injector 126 to supply carbon dioxide stored in the storage chamber 101 to the washing chamber 104, or control the second injector 127 to supply the additive stored in the additive container 102 to the washing chamber 104.

The washing machine 1 may perform an operation of discharging the mixed solution used in the washing cycle from the washing chamber 104 (1400).

Contaminants contained in the laundry may be combined with the additives in the mixed solution, and part of the contaminants separated from the laundry may be filtered out by the filter 106 by passing the mixed solution discharged from the washing chamber 104 through the filter 106.

The remaining of the contaminants separated from the laundry may be separated from the additives in a process of vaporization of the additives.

The discharging of the mixed solution may include controlling the opening of the 6$^{th}$ valve 136 and controlling the operation of the pump 107 such that the mixed solution in the washing chamber 104 moves to the distillation chamber 109. In this case, the controlling of the operation of the pump 107 may allow the mixed solution stored in the reserve chamber **108*a* also to be moved to the distillation chamber 109 via the filter 106**.

The controller 160 may, upon identifying that the discharge of the mixed solution is completed, control stop of the pump 107 and control closing of the 6$^{th}$ valve 136.

According to one or more embodiments, the controller 160 may, while opening valves (e.g., the 6$^{th}$ valve 136 and the 8$^{th}$ valve 138) for opening and closing the passages between the washing chamber 104 and the storage chamber 101, depressurize the washing chamber 104 to vaporize the carbon dioxide contained in the mixed solution such that the carbon dioxide is moved to the storage chamber 101, and then close valves (e.g., the 6$^{th}$ valve 136 and the 8$^{th}$ valve 138) and pump the liquid additive using the pump 107 such that the liquid additive is moved to the distillation chamber 109.

The washing machine 1 may perform an operation of vaporizing the mixed solution discharged from the washing chamber 104 (1500). Operation 1500 of vaporizing the mixed solution discharged from the washing chamber 104 may include not only an operation of vaporizing the mixed solution discharged from the washing chamber 104, but also an operation of, upon carbon dioxide being first discharged from the washing chamber 104, vaporizing the additive discharged from the washing chamber 104 according to one or more embodiments.

The vaporizing of the mixed solution may include lowering the pressure in a space (e.g., the washing chamber 104 or the distillation chamber 109), in which the mixed solution is stored, to vaporize carbon dioxide contained in the mixed solution, and then raising the temperature of a space (e.g., the distillation chamber 109), in which the additive is stored, to a predetermined temperature (e.g., a preset temperature of 40° C. or lower) to vaporize the additive. In this case, the predetermined temperature may vary depending on the boiling point of the additive. In the case of an additive having a boiling point of 40° C. or lower, the predetermined temperature may be preset to a temperature higher than or equal to the boiling point of the additive and lower than or equal to 40° C.

Liquid carbon dioxide contained in the mixed solution discharged from the washing chamber 104 has a very low boiling point at low atmospheric pressure, and thus the liquid carbon dioxide may naturally vaporize based on the pressure being lowered.

Accordingly, the carbon dioxide in the washing chamber 104 or the liquid carbon dioxide delivered to the distillation chamber 109 may vaporize and move to the storage chamber 101 in a gaseous state.

According to one or more embodiments, the controller 160 may depressurize the washing chamber 104 or the distillation chamber 109 to vaporize the liquid carbon dioxide, or as the distillation chamber 109 is maintained in a depressurized state, the liquid carbon dioxide in the distillation chamber 109 may vaporize.

The controller 160 may open the 8$^{th}$ valve 138 for a predetermined period of time while the mixed solution is being discharged from the washing chamber 104 or after the discharge of the mixed solution from the washing chamber 104 is completed, thereby allowing gaseous carbon dioxide to flow into the storage chamber 101.

Accordingly, carbon dioxide contained in the mixed solution used in the washing cycle 1300 may be transferred to the storage chamber 101 in a gaseous state.

The additives contained in the mixed solution discharged from the washing chamber 104 have a higher boiling point than carbon dioxide and therefore use heating for the additives to vaporize.

The controller 160 may heat the distillation chamber 109 to vaporize the additive. According to one or more embodiments, the controller 160 may operate the compressor C to heat the distillation chamber 109.

The additives contained in the mixed solution discharged from the washing chamber 104 may be in a state of combined with contaminants, and as the additives are vaporized in the distillation chamber 109, the contaminants may be separated from the additives in the distillation chamber 109.

The gaseous additive from which the contaminants have been separated may be cooled in the cooling chamber 110 to thereby be converted to a liquid state and transferred to the additive container 102.

The controller 160 may open the 9$^{th}$ valve 139 to move the additive stored in the cooling chamber 110 to the additive container 102. According to one or more embodiments, the 9$^{th}$ valve 139 may be replaced with a pump or injector. Here, the opening of the 9$^{th}$ valve 139 may include operating a pump or injector.

As described above, the controller 160 may control the plurality of valves 130 to move the carbon dioxide stored in the storage chamber 101 and the additive stored in the additive container 102 to the mixing chamber 103 and generate a mixed solution that maintains a liquid state even at a pressure of 10 bar or lower in the mixing chamber 103.

According to one or more embodiments, the washing machine 1 capable of being driven even at a pressure of 10 bar or lower, and the method of controlling the washing machine 1 are provided. According to one or more embodiments, a carbon dioxide washing machine 1 that may be used for household purposes is provided.

Hereinafter, the disclosure is described in more detail by the following one or more embodiments. However, the following one or more embodiments are only for illustrating the present disclosure, and the scope of the present disclosure is not limited only thereto.

Embodiment

Manufacturing Example: Manufacturing of Additives

A washing solvent was prepared by mixing carbon dioxide and additives as shown in Table 1 below such that the washing solvent maintains a liquid state even at a pressure of 10 bar or below.

Table 1 below shows the molar fraction for each additive.

In Table 1 below, Grade 1 includes an additive with a wetness index greater than or equal to 40 and a boiling point lower than or equal to 40° C., and for separation from contaminants, the additive may be vaporized. Grade 2 includes an amphiphilic additive with a wetting index greater than or equal to 40 and a boiling point higher than 40° C., and for separation from contaminants, the characteristics of a hydrophilic solvent may be used such that the additive is separated because the additive is not easily vaporized due to having a high boiling point. Grade 3 includes a lipophilic additive with a wetting index greater than or equal to 40 and a boiling point higher than 40° C., and for separation from contaminants, a separate structure or method may be used.

TABLE 1

| | Division | Molar fraction (mol %) |
|---|---|---|
| Grade 1 | Methyl perfluoropropyl ether (Novec 7000) | 85.3 |
| | cis-1,1,1,4,4,4-hexafluoro-2-butene (Opteon MZ) | 85.4 |
| | mixture of trans-1-chloro-3,3,3-trifluoropropene and trans-1,2-dichloroethylene(Opteon SF30) | 85.6 |
| | diethyl ether | 85.4 |
| Grade 2 | ethanol | 84.6 |
| | methanol | 84.6 |
| | isopropanol | 84.0 |
| Grade 3 | hexadecane | 84.5 |
| | tetradecane | 84.0 |
| | decane | 84.5 |
| | nonane | 84.5 |
| | N-undecane | 84.5 |

Experiment Example. Evaluation of Cleaning Power

Specimens (100% cotton) were prepared, and the specimen was impregnated with water-soluble contaminations obtained by dissolving 10 g of blood and 10 g of wine in 100 mL of hot water, and oil-soluble contaminations of sebum, carbon, or cocoa, and then the specimens were dried at 60° C. for 2 hours and 30 minutes to manufacture contaminated cloth.

Each contaminated cloth was washed for 10 minutes using liquid carbon dioxide, carbon dioxide+decamethylcyclopentasiloxane, carbon dioxide+a mixture of methyl nonafluoroisobutyl ether and methylnonafluorobutyl ether, carbon dioxide+decamethylcyclopentasiloxane+ethanol, and carbon dioxide+decamethylcyclopentasiloxane+diethyl ether to measure the cleaning powers of the washing solvents for each contamination.

Figure 5:
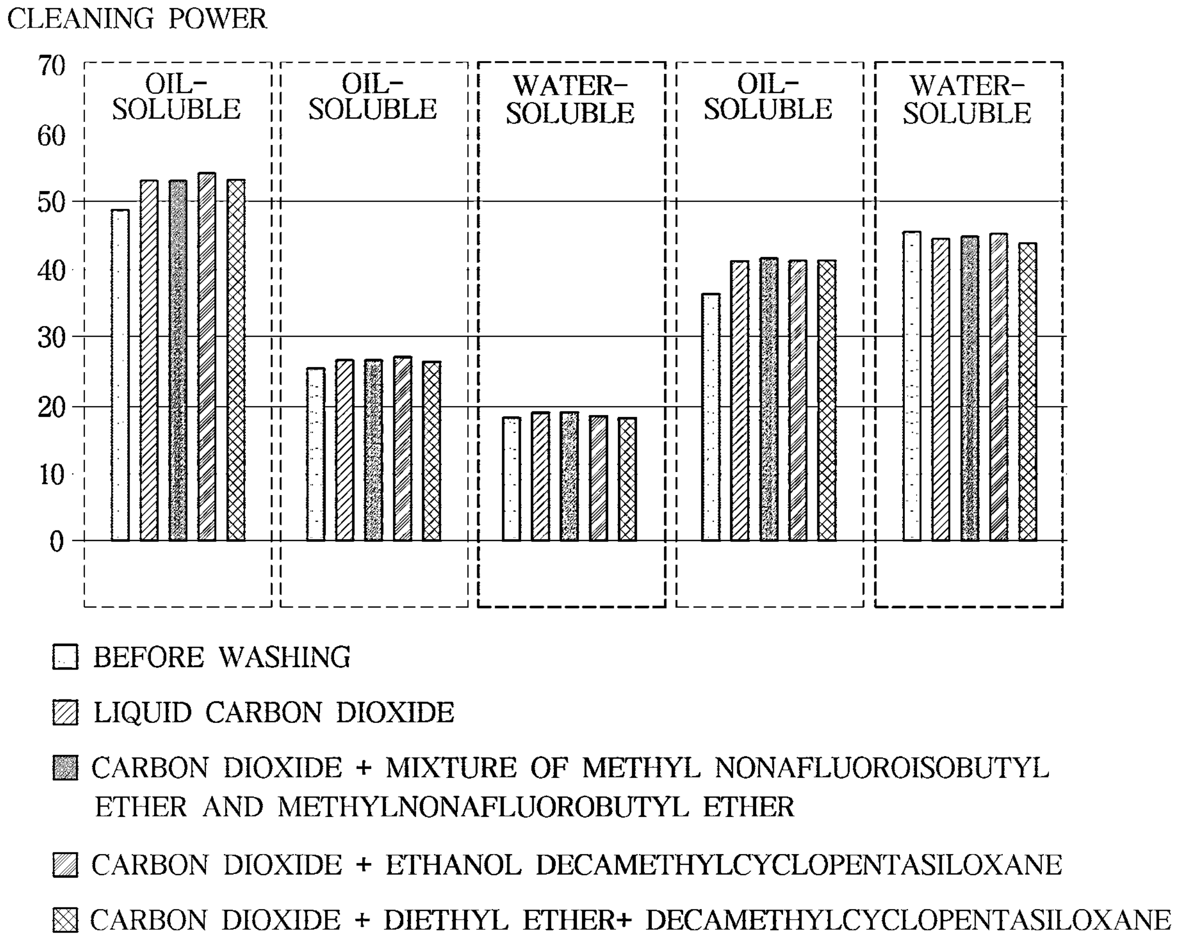
FIG. 5 is a diagram illustrating cleaning power of washing solvents for various types of contaminants according to one or more embodiments.

A surface reflectance before and after washing was observed using a colorimeter (Minolta CR-300 Chromameter) to calculate the cleaning power according to Equation 2, and the results are shown in FIG. 5.

$$\text{(cleaning power)} = \frac{R_w - R_s}{R_o - R_s} \times 100(\%) \qquad \text{[Equation 2]}$$

Here, $R_o$ is the surface reflectance of the original cloth, $R_s$ is the surface reflectance of the contaminated cloth before washing, and $R_w$ is the surface reflectance of the contaminated cloth after washing.

In this case, liquid carbon dioxide was used at a pressure of 50 bar or higher, and the other washing solvents was used at a pressure of 10 bar or lower for the washing.

Referring to FIG. 5, washing with a mixture of carbon dioxide and additives according to one or more embodiments shows a similar degree of cleaning power for oil-soluble contamination and water-soluble contamination, in comparison with using liquid carbon dioxide that uses a driving pressure to be maintained at 50 bar or higher. The washing cycle using liquid carbon dioxide alone maintains a high driving pressure of 50 bar or higher while use of a mixed solution of carbon dioxide and additives according to one or more embodiments may achieve the washing cycle even at a driving pressure of 10 bar or lower.

Although the disclosure has been shown and described in relation to one or more embodiments, it would be appreciated by those skilled in the art that changes and modifications may be made without departing from the principles and scope of the disclosure.

What is claimed is:

1. A washing machine comprising:

memory storing a program or at least one instruction;

at least one processor:

a storage chamber configured to store carbon dioxide in a gaseous state;

an additive container configured to store an additive;

a mixing chamber;

a washing chamber;

a distillation chamber;

a plurality of valves;

at least one pump; and at least one motor, wherein the at least one instruction, when executed by the at least one processor, individually or collectively, causes the washing machine to:

control at least one of the plurality of valves to cause the carbon dioxide in the gaseous state to flow from the storage chamber into the mixing chamber;

control at least one of the plurality of valves to cause the additive to flow from the additive container into the mixing chamber;

control at least one of the plurality of valves to pressurize the carbon dioxide and the additive in the mixing chamber to generate a mixed solution in a liquid state, wherein the additive lowers a vapor pressure of the mixed solution such that the mixed solution is maintained in the mixing chamber in a liquid state at a pressure of 10 bar or less;

control at least one of the plurality of valves to cause the mixed solution to flow into the washing chamber;

control the at least one motor to cause the washing chamber to wash laundry using the mixed solution supplied from the mixing chamber;

control the at least one pump to cause the mixed solution to be discharged from the washing chamber into the distillation chamber; and control at least one of the plurality of valves to cause the carbon dioxide to be vaporized in the distillation chamber from the mixed solution therein.

2. The washing machine of claim 1, wherein the at least one instruction, when executed by the at least one processor, individually or collectively, causes the washing machine to, in response to a pressure inside the distillation chamber being lowered, control at least one of the plurality of valves to cause the carbon dioxide, in a gaseous state, to be discharged from the distillation chamber into the storage chamber.

3. The washing machine of claim 1, wherein the distillation chamber is disposed at a position higher than a plurality of positions from among the storage chamber, the additive container, and the washing chamber.

4. The washing machine of claim 1, wherein the at least one instruction, when executed by the at least one processor, individually or collectively, causes the washing machine to control at least one of the plurality of valves to generate the mixed solution having a wetting index greater than or equal to 40, wherein the wetting index expressed by the following equation:

$$\text{(wetting index)} = \frac{\text{density}}{\text{viscosity}} \times \text{(surface tension)} \times 1000.$$

5. The washing machine of claim 1, wherein the at least one instruction, when executed by the at least one processor, individually or collectively, causes the washing machine to control at least one of the plurality of valves to mix the carbon dioxide and the additive such that the mixed solution comprises the additive in an amount of 84.0 mol % or more.

6. The washing machine of claim 1, wherein the at least one instruction, when executed by the at least one processor, individually or collectively, causes the washing machine to control the distillation chamber to vaporize the additive, wherein the additive has a boiling point of 40° C. or lower.

7. The washing machine of claim 6, further comprising a cooling chamber and at least one of a heater or a compressor, wherein the at least one instruction, when executed by the at least one processor, individually or collectively, causes the washing machine to:

control the heater or the compressor to increase a temperature inside the distillation chamber to vaporize the additive separated from the mixed solution; and control at least one of the plurality of valves to cause the additive, discharged from the distillation chamber and liquefied in the cooling chamber, to be recovered to the additive container.

8. The washing machine of claim 6, wherein the additive stored in the additive container is an additive having lipophilicity and non-flammability.

9. The washing machine of claim 8, wherein the additive stored in the additive container includes any one of a mixture of methyl nonafluoroisobutyl ether and methyl nonafluorobutyl ether, a mixture of trans-1-chloro-3,3,3-trifluoropropene and trans-1,2-dichloroethylene, cis-1,1,1,4,4,4-hexafluoro-2-Butene, 1,1,1,2,2,4,5,5,5-nonafluoro-4-(trifluoromethyl)-3-pentanone, or methyl perfluoropropyl ether.

10. The washing machine of claim 6, wherein the additive stored in the additive container includes diethyl ether.

11. The washing machine of claim 1, wherein the additive stored in the additive container is an additive having lipophilicity.

12. The washing machine of claim 11, wherein the additive stored in the additive container includes one of hexadecane, tetradecane, decane, nonane, or N-undecane.

13. The washing machine of claim 1, wherein the additive stored in the additive container includes an additive having amphiphilicity.

14. The washing machine of claim 13, wherein the additive stored in the additive container includes one of ethanol, methanol, or isopropanol.

15. The washing machine of claim 1, wherein the additive stored in the additive container is an additive having lipophilicity and silicone-based affinity including any one of octamethylcyclotetrasiloxane or decamethylcyclopentasiloxane.

* * * * *